Aug. 24, 1943.     T. B. CHACE     2,327,500
PROCESS OF MAKING BIMETAL THERMOSTATIC ELEMENTS
Original Filed May 22, 1936
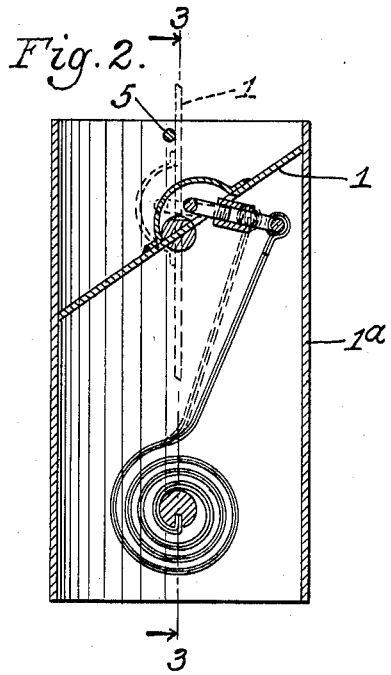
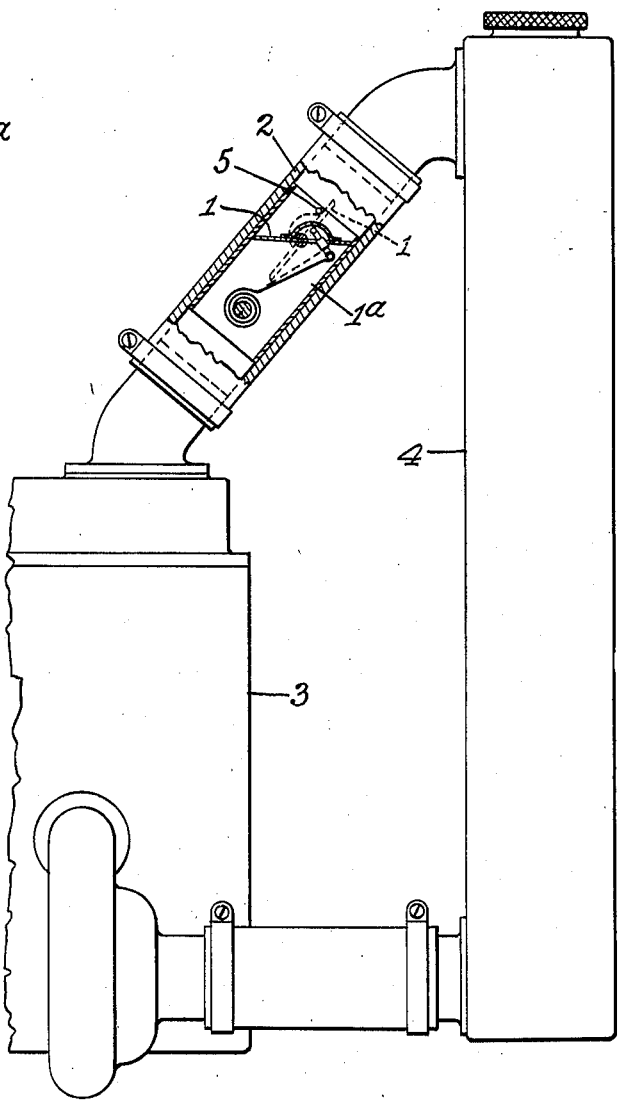
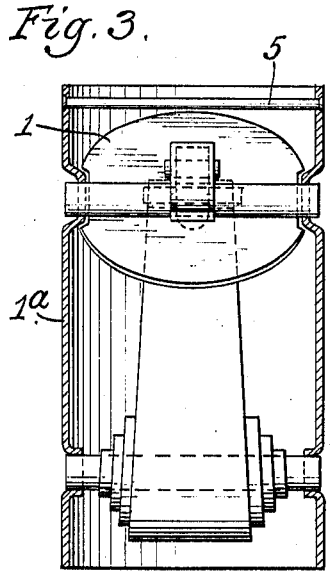
Inventor.
Thomas B. Chace.
by Parker & Carter
Attorneys.

Patented Aug. 24, 1943

2,327,500

UNITED STATES PATENT OFFICE 2,327,500

PROCESS OF MAKING BIMETAL THERMOSTATIC ELEMENTS

Thomas B. Chace, Winnetka, Ill., assignor to The Dole Valve Company, Chicago, Ill., a corporation of Illinois Original application May 22, 1936, Serial No. 81,284. Divided and this application December 19, 1939, Serial No. 309,977

1 Claim. (Cl. 148—11.5)

This invention relates to a process of making thermostatic bimetals. The invention has as an object to provide a process of making a thermostatic bimetal which when formed into a thermostatic element, will have a useful deflection with temperature change and will particularly have also a high tensile strength and a high resistance to set, so that no change in calibration takes place when the bimetal is incorporated in a device that after useful deflection takes place and further movement of the bimetal is then prevented, the temperature to which the bimetallic element is subjected continues to rise, building up considerable force in such element.

Tensile strength or resistance to set, as it applies here, of a solid-solution type alloy is first the result of chemical analysis. Variables of these properties are relative to hardness, and hardness is relative to wroughting or work hardening. The present thermostatic applications require severe forming of the elements to incorporate them in thermostat devices. I have found that if the now available thermostatic bimetals are hardened by working, such as rolling to the extent that resistance to set is high, they are too refractory and fracture in forming, which fracture becomes the weakest point and destroys the resistance to set. If work hardened only sufficiently to be ductile enough for forming, the resistance to set is low.

The invention has as a further object to provide a heat treating process by means of which thermostatic metal parts are hardened, resulting in an increase in torque and in the neutralization of the internal strains, so that the thermostatic element will return to the same position at a given temperature after repeated heating and cooling thereof.

Invar or the low expanding nickel alloy has a higher modulus of elasticity than the copper alloys in similar work hardened condition and one object of this invention is to provide a bimetal element of Invar and a copper alloy, which copper alloy has a similar modulus of elasticity to Invar. The invention may be used in any desired manner where thermostatic metal is desirable.

A particular application of the invention is automobile cooling system thermostats incorporating a movable valve for controlling water flow and a temperature responsive bimetal coil element which is arranged in a coil or otherwise, to move the valve to its open and closed position. For purposes of illustration, I have indicated in the drawing one form of device illustrating such use.

Fig. 1 is a view in part section, showing an automobile cooling system with a valve and thermostat in position;

Fig. 2 is an enlarged sectional view through the casing of the valve and thermostat;

Fig. 3 is a sectional view through the valve casing, taken on line 3—3 of Fig. 2, showing the entire valve.

Like numerals refer to like parts throughout the several figures.

This application is a division of my application Serial No. 81,284, filed May 22, 1936, which issued March 26, 1940, as U. S. Patent No. 2,194,738.

In this construction there is a valve 1 arranged in a casing 1a, the valve and casing being located in the pipe 2 leading from the engine jacket 3 to the radiator 4. I have illustrated a stop 5 which is engaged by the valve when the valve is in its fully open position, as shown in dotted lines in Figs. 1 and 2. When the engine is cold the valve is closed, as shown in full lines, and when the cooling liquid for the engine heats up, the thermostat is heated and moves the valve to its open position. In this use in its action through the temperature range of approximately 140° to 180° F., the bimetal element has completed its useful deflection and the valve has reached its wide open position, as shown in dotted lines in the drawing, so no further travel is necessary or possible. Temperatures greatly in excess of 180° F. are sometimes reached in an automobile cooling system due to low water, frozen radiator, or numerous other causes. Any increase in temperature over 180° F. builds up a force in the bimetal element, which if free would continue to deflect with temperature increases. Since the valve 1 cannot move any farther than to its fully open position, as shown in dotted lines, its movement is stopped and the increase in temperature simply builds up a force in this thermostatic element without producing any further movement of the valve 1. If the element does not have a high resistance to set, under this condition a change in calibration takes place increasing the operating range above the original 140° to 180° F., causing continual overheating and possible severe damage to the engine.

I have provided a thermostatic bimetal entirely satisfactory for this type of application by utilizing with a low expanding member, such member formed of nickel and iron containing 32 to 45 percent nickel and remainder iron, a series of copper alloys having relatively high and cooperating co-efficients of expansion and other properties permitting a combination of the nickel steel alloy and one of the copper alloys of approximately equal proportional thickness in composite slab form to be converted into sheet form. These copper alloys have the important property of hardening without working or reduction of area so that the completely formed bimetal element as ready for assembly into the device can be further hardened and resistance to set increased by aging.

I provide a copper alloy, which of the solid solution type, has a relatively high modulus of elasticity and to this I add an element or combination of elements, the solubility of which in the copper alloy is greater at high temperatures than at low temperatures.

Age hardening, or precipitation hardening occurs only in alloys of the solid solution type which contain a hardening constituent, the solubility of which in the alloy at high temperatures is greater than at low temperatures. The solid solution when quenched from the above solid solubility temperature is supersaturated and unstable and on reheating to a temperature below the solid solubility temperature, the unstable solution tends to revert to an equilibrium condition which corresponds with a tempering effect. The resulting increase in hardness is a supersaturated solid solution hardening.

Usually increases in hardness and strength or resistance to set are comparable and this is true of the alloys covered here for thermostatic bimetal, although there are some exceptions to the rule.

There is a change with temperature in the solubility of iron in copper from approximately 4 percent at 2000° F. to approximately .5 percent at 1000° F. I find that iron as a hardening constituent in my copper alloy for thermostatic metal use to be particularly desirable, as drastic quenching is not necessary to bring about supersaturation at low temperatures. Remarkable hardening can be produced by cooling slowly and reheating to a temperature under the first temperature. The solubility of silicon in copper varies from 6.7 percent at 1350° F. to about 4 percent at 750° F. but a copper alloy containing over 3 percent silicon is very refractory and difficult to roll. So silicon alone as a hardening constituent is not desirable. However, silicon with necessary amounts of nickel, iron, chromium, or cobalt forming the corresponding silicides are particularly susceptible to age hardening; for example, nickel silicide is soluble in copper to the extent of 8.2 percent at 1830° F. and only .7 percent at 570° F. Cobalt silicide is soluble in copper to the extent of 3.3 percent at 1830° F. and only .7 percent at 570° F. I have found that a nickel-iron-silicon-copper alloy having the metals in substantially the following proportions to be particularly useful and efficient for my thermostatic bimetal, nickel .5 percent to 5 percent, iron .1 percent to 5 percent, silicon .5 percent to 3 percent, and the remainder copper. I may add to the foregoing materials manganese in the proportions of .25 percent to 1 percent. I may also use the following alloy, for example, silicon .5 percent to 1 percent, cobalt .5 percent to 3.5 percent, and the remainder copper, or I may use silicon .5 percent to 1.5 percent, nickel .5 percent to 5 percent, iron .1 percent to 5 percent and aluminum .5 percent to 5 percent, and the remainder copper, or silicon .3 percent to 3 percent, nickel 2 percent to 30 percent, aluminum .5 percent to 8 percent, and the remainder copper. Other alloys which I may use may be as follows.

.5 to 15% Mn, 5 to 10% Al, remainder Cu.
.5 to 3.5% Co, 5 to 10% Al, remainder Cu.
1 to 3% Si, 5 to 40% Ni 5 to 10% Sn, remainder Cu.
.5 to 3% Si, .25 to 5% Ni, remainder Cu.
.5 to 3% Si, .25 to 3.5% Co, remainder Cu.
.5 to 3% Si, .1 to 5% Cr, remainder Cu.
1 to 3% Si, 2 to 12% Mn, remainder Cu.
1 to 3% Si, 1 to 5% Ni 5 to 35% Zn, remainder Cu.
.5 to 3% Si, 10 to 40% Ni, remainder Cu.
1 to 32% Sn, .25 to 2.5% Be, remainder Cu.
.5 to 2% Ni, .25 to 2.5% Be, remainder Cu.
.5 to 3% Si, .1 to 5% Fe, remainder Cu.
.5 to 10% Fe, remainder Cu.
10 to 75% Ni, 1 to 10% Al, remainder Cu.
10 to 70% Ni, 1 to 10% Al, .3 to 5% Fe, remainder Cu.

The thermostatic bimetal of Invar and one of the above copper alloys for this purpose are welded in slab form and rolled into sheets or strips. This is cut up into usable sizes and then formed into coils or other shapes and then treated to increase resistance to set.

The details of method in obtaining the increased strength or resistance to set varies with the different combinations of copper alloys and nickel-steel, but the resulting strength of the bimetal element after treating is greater than that obtained by work hardening as by cold rolling to a hardness which is still ductile enough for forming into a coil shaped like the automobile cooling system thermostatic coil.

Hardening of an age hardenable alloy is done by heating to approximately the solid solution temperature of the particular alloy and then quenching. The hardening or aging takes place during a subsequent reheating of one to several hours to a temperature lower than the quenching temperature. The quenching temperature is usually between 1300° F. and 1600° F. and the aging temperature between 400° F. and 1150° F. When temperature and time prior to quenching are sufficient to anneal or soften the Invar, the following increase in hardness by aging the copper alloy would in some combinations not be as great as the loss and the bimetal shape would have a lower resistance to set than before age hardening. In this event, the first heating and quenching is done prior to the finished gauge thickness and then cold worked by rolling to harden the Invar, which work hardens more readily than the copper alloy. The copper alloy is partially hardened by the cold working but only sufficiently so as to be ductile enough for forming. Further hardening is then accomplished on the formed or shaped individual bimetal coils or pieces by aging at a temperature lower than the quenching temperature. The resulting increased hardness of the copper alloy is similar to the effect from excessive cold working but if hardened in sheet form by cold rolling the material would not form, as described, without fracture.

I have found that the preferred heat treatment is a heat treatment at a temperature to bring out the increased efficiency of about 650° F. and the preferred length of time to be two six-hour cycles of heating at this temperature and then slowly cooling at room temperature. The desired results can be obtained by various combinations of type and temperature within the temperature range of 400° F. to 750° F.

I claim:

The process of making bimetal thermostatic elements, which consists in welding together a strip of a ferrous alloy comprising 35 percent to 45 percent nickel, and a strip of copper alloy comprising silicon 0.5 percent to 3.0 percent, nickel 0.5 percent to 5.0 percent, manganese .25 percent to 1.0 percent, iron 0.1 percent to 5.0 percent and the remainder copper, quenching at a temperature between 1300° F. and 1600° F., a portion of the exposed surfaces of both strips being out of contact and applying pressure to the exposed surfaces of the strips by cold rolling said strip a sufficient time to harden the copper alloy and leave it still ductile enough for forming into a coil shaped thermostat, and then heat treating said strip at a temperature within the temperature range of 400° F. to 750° F.

THOMAS B. CHACE.